UNITED STATES PATENT OFFICE.

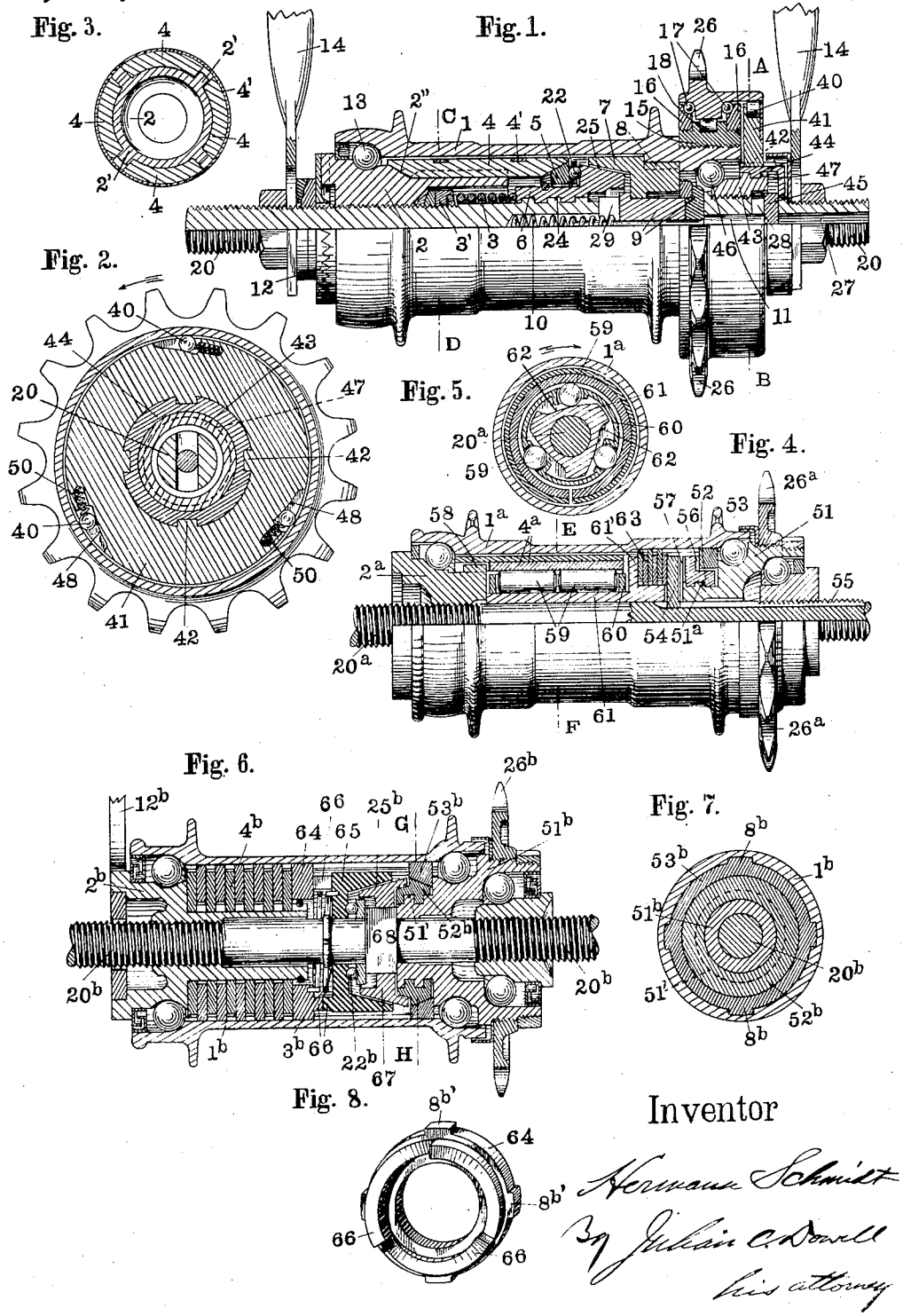

HERMANN SCHMIDT, OF SUHL, GERMANY.

FREE-WHEEL COASTER-BRAKE WITH FRICTION-CLUTCH.

1,359,468. Specification of Letters Patent. Patented Nov. 16, 1920.

Application filed August 13, 1919, Serial No. 317,382. Renewed October 16, 1920. Serial No. 417,530.

*To all whom it may concern:*

Be it known that I, HERMANN SCHMIDT, a citizen of the Federal Republic of Germany and of the State of Prussia, residing at No. 6 Ellerstrasse, of Suhl, in Thuringia, Germany, have invented certain new and useful Improvements in Free-Wheel Coaster-Brakes with Friction-Clutches, of which the following is a specification.

This invention relates to free-wheel coaster-hubs for cycles in which the brake mounted therein is applied by the rotating hub of the rear-wheel itself, when a clutch is operated which enables the transmission of power from the hub to the brake actuating mechanism. In my Patent 1,280,558 I have described several cycle hubs constructed according to the said principle in combination with controlling mechanisms operated by hand.

The object of the invention is to so construct and arrange the driving gear and to so combine it with the brake and with brake applying means, such as stated hereinbefore, that the brake can be operated by the *vis viva* of the cycle in movement, after the aforesaid clutch has been let in by an initial back-pedaling motion of the driver of the cycle. This operation is different from the usual back-pedaling in coaster-hubs in so far as the power applied to the pedals is not availed to the direct application of the brake, but will only act upon the friction clutch, so that a small power will be sufficient for a high braking action, while any desired gradation in braking is rendered possible.

To attain this object, a free-wheel driving appliance of any suitable construction is combined with a self-operating mechanism which on backward rotation of the driving gear produces the connection of said driving gear with controlling means adapted to let in the aforesaid friction clutch.

In the drawing, which forms a part of this specification, several embodiments of the invention are illustrated as examples. In said drawing—

Figure 1 is partly a side view and partly a longitudinal sectional elevation of a coaster-brake and the operating means therefor, constructed in accordance with the principle herebefore disclosed;

Fig. 2 is a cross-section taken on the line A—B in Fig. 1;

Fig. 3 is a cross-section of the brake members separately on the line C—D in Fig. 1;

Fig. 4 is partly a side-elevation and partly a longitudinal sectional view of a more compact modification of the free-wheel coaster-hub;

Fig. 5 is a cross-section of the latter construction on the line E—F in Fig. 4;

Fig. 6 is a further modification of the free-wheel coaster-hub, shown in a longitudinal sectional elevation;

Fig. 7 is a cross-section on the line G—H in Fig. 6, and

Fig. 8 is a perspective view of a detail of the construction illustrated in Fig. 6.

Similar reference numerals designate similar parts throughout all figures of the drawing.

Referring first to the construction represented in Figs. 1 to 3, 1 indicates the hub-shell of the rear wheel of a cycle. 13 is the ball bearing, arranged in the left end of the hub, and 2 is the corresponding bearing cone therefor, connected to the cycle frame 14 non rotatably by means of a corrugated washer 12 engaged with the fork part of the cycle (Fig. 1), or with the use of an arm 12$^b$ (Fig. 6) in a well-known manner. At the right hand within the hub 1 there is a second ball bearing 46 arranged running on a bearing cone 43 screwed upon the wheel-axle 20.

The expansible brake sleeve is composed of any convenient number of blocks 4, for example, four, which are assembled by split rings 4', and supported upon an axial projection of the inner end of the bearing cone 2, depressions or seats being formed therein for the blocks between longitudinal ribs 2' which also prevent the brake sleeve from revolving but allow of its displacement. Both ends of the brake sleeve are conically hollowed out or internally tapered, the left end being located upon corresponding slopes 2" of the cone 2 and the right end upon a movable expanding cone 5. The said cone encircles a sleeve 6 provided with female screw threads and engaging therewith in corresponding right hand screw threads 24 formed upon the axle 20. To diminish friction an end-thrust ball-bearing 22 is disposed between the cone 5 and the sleeve 6. This arrangement of the brake-applying appliance will cause the brake sleeve to be expanded by the cones 2 and 5, and pressed on the inner face of the hub 1, when the sleeve 6 is rotated in the direction of the forward rotation of the hub 1. A coiled spring 3 engaging with its ends in the sleeve 6 and a nut 3' fixed on the axle 20, respectively, will return the sleeve 6 to its initial position when released.

A driving member, for instance, a sprocket wheel 26 is supported upon the hub 1 free to rotate by means of ball-bearings 17 the cones 16 of which are attached to a ring 15 fixed upon screw threads of the hub 1.

Upon the periphery of the bearing cone 43 are formed left hand screw threads 47 engaged with corresponding female screw threads of a cap 44. A disk 41 located in the body or rim of the sprocket wheel 26 incloses the cap 44, keys or feathers 42 engaging key ways made in the periphery of the cap 44, thereby preventing relative rotation of the connected parts but allowing the axial displacement of the cap 44, when it is screwing to and fro upon the cone 43. As can best be seen in Fig. 2, sloping pockets 48 in any desired number are provided in the periphery of the disk 41 with friction rollers 40 contained and movable therein, springs 50 holding the rollers in contact with the body of the sprocket 26. The pockets are of the common form and so disposed that the roller clutch permits of the free forward rotation of the sprocket wheel independently of the disk 41, but will couple the said parts in the backward rotation of the sprocket wheel (see arrow in Fig. 2), whereupon the cap 44 is screwed upon the cone 43 to the left.

In the circumference of the ring 15 similar pockets are made with friction rollers 18 contained therein, those pockets being descending or sloping inversely to the pockets 48, the rollers 18 bearing on the inner periphery of the sprocket wheel 26; this friction roller-clutch formed between the ring 15 and the sprocket wheel will therefore connect the said parts, when the sprocket wheel is rotating in the forward direction, that is to say, oppositely to arrow in Fig. 2.

A central bore 27 is formed in the axle 20, as well as cross slots 28 and 29 intersecting the bore. A slide 45 situated in the outer slot 28 bears on the inner side of the plane part of the cap 44 with its one side, and on the end of a pin 11 with its other side, which pin is displaceable in the bore 27, and will therefore transmit the axial movement of the cap to said pin and to other slide plates 9 which are movable in the slot 29 and controlled by the pin 11. A spring 10 also located in the bore 27 tends to move the entire controlling mechanism back to the right. Lugs projecting from the plates 9 embrace a ring-like member 7 which is displaceable and rotatable on the axle 20, but connected to the hub 1 by keys 8 and key-ways in a similar manner, as shown in Figs. 7 and 8 with respect to other parts. Conical faces 25 formed on the member 7 and on the sleeve 6 are the engaging parts of a bevel coupling adapted to connect the member 7 to the sleeve 6, when the former is pushed to the left. This will have the effect that the hub will carry with it the sleeve 6 in its forward rotation, the brake being thereby applied.

The construction operates as follows:

When the driving member 26 is stopped in propelling the cycle, the free-wheel coupling 18 automatically uncouples the hub 1 which will then be free to rotate. Back-pedaling has the effect to couple the driving wheel 26 with the disk 41, whereafter the disk and cap 44 are turned backward, while the latter is also screwed to the left upon the cone 43. This movement pushes the slide 45, the pin 11, the slides 9 and the member 7 to the left, bringing the conical faces of the friction clutch 25 to gripping contact. As the ring member 7 is turning in unison with the hub 1, the sleeve 6 is screwed toward the cone 2, thereby applying the brake as above stated. The braking effect may be regulated at will by the driver of the cycle by varying the force with which he is acting upon the clutch 25, whereby the degree of slipping of said clutch is regulated. After the brake has been fully applied, the sleeve 6 will be immobilized, whereupon the bevel faces 25 will slip the one on the other. When back-pedaling ceases, the spring 10 moves the member 7 and its controlling appliance 9, 11, 45 to the right, also screwing the cap 44 to its neutral position. On the other hand the spring 3 will screw the sleeve 6 back to the right, so that the brake is taken off the hub 1.

In the construction shown in Figs. 4 and 5, the sprocket 26ª is rigidly fixed upon a driving member 51 having an inwardly directed projection and right hand screw threads 51ª provided thereon. A sleeve 52 engaging the said threads with corresponding female screw threads is encircled by a coupling ring 53 which is positively coupled to the hub 1ª by means of keys in a similar manner as illustrated in Fig. 7. When by turning the driving member 51 in the forward direction the sleeve 52 is screwed to the right, the ring 53 will be locked or clamped between the sleeve and the driving member, and the cycle be driven. Close to the inner end of the driver 51 there is a disk 54 displaceably arranged on the axle 20ª, but non-rotatably fixed thereon, an inwardly directed projection of said disk being engaged in a longitudinal groove 55 of the axle. Preferably toothed couplings 56 and 57 are used to connect the sleeve 52 to the ring 53 or to the disk 54, respectively.

The brake composed of two concentric split sleeves 4ª is attached to the fixed bearing cone 2ª by means of a lug 58 received in a slot of the brake. The device for applying the brake comprises several sets of expanding rollers 59 retained in a spacer ring 60, and a sleeve 61 rotatable upon the axle and provided with circumferential sloping depressions 62 which ascend in the sense of backward rotation of the hub 1ª, as indicated by arrow in Fig. 5. Close to the disk 54 the sleeve 61 is provided with a flange 61' and a multiple disk clutch 63 of known construction, the disks of which are alternately in engagement with longitudinal grooves of the hub and the sleeve 61, respectively. By back-pedaling, the sleeve 52 will be screwed toward the disk 54, thus pressing the disks of the laminate clutch 63 to each other, whereby the power applied can be regulated. After the brake has been fully applied, the disk clutch will slip and act as an auxiliary brake. When released, the brake cylinder 4ª will contract itself by reason of its inherent elasticity and at the same time remove the rollers 59 and the sleeve 61 to their original inoperative positions.

In the construction illustrated in Figs. 6, 7 and 8, the driving mechanism, composed of the parts 26ᵇ, 51ᵇ, 52ᵇ, 53ᵇ and 51', is similar to the corresponding device, shown in Fig. 4; detailed description may therefore be dispensed with.

The multiple disk brake 4ᵇ here employed is mounted upon the bearing cone 2ᵇ, the disks being alternately connected with the said cone and the hub 1ᵇ in a known manner. The brake applying mechanism arranged between the brake and the driving appliances comprises two disk shaped members 64 and 65 engaging each other with bevel teeth 66 (Fig. 8). The member 64 is connected to the hub 1ᵇ through lugs 8ᵇ' (Fig. 8) and is axially displaceable therein, while the member 65 is rotatable upon the axle 20ᵇ and held against displacement by an end-thrust ball-bearing 22ᵇ. The member 65 further bears a flange having an inner conical face 25ᵇ opposite to a corresponding cone-member 67 which is movable on a square part 68 of the axle but prevented from rotation. The ends of spring 3ᵇ are attached to the members 64 and 65, respectively, the spring serving the purpose to reconduct the members 64 and 65 to their original neutral position, when a relative turning has taken place.

Driving and free-wheeling with this constructional embodiment may easily be understood, as they are similar to the operation of known coaster-brakes. With back-pedaling the screw-threaded sleeve 52ᵇ will screw off the bearing 51ᵇ and thereby shift the cone 67 so far to the left that the bevel clutch 25ᵇ will be brought into action. The helical faces of the teeth 66 of the two members 64 and 65 will then commence to slide the ones upon the others, which movement forces the member 64 to the left, the disks of the brake 4ᵇ being pressed upon each other.

The braking action being dependent on the degree of gripping of the friction coupling, it will be clear that owing to the easy variation of the power applied in back-pedaling, any desired adjustment of the brake can be performed at the time being, and that it is only required to employ the power for holding the faces of the friction coupling in contact, while the application of the brake is effected by the rotating wheel-hub, the action of the brake proper being assisted by the sliding of the friction-clutch which then has the effect of an accessory brake.

Several constructions founded on the principle disclosed in the preamble of the foregoing specification have been illustrated in the drawing and detailed in connection therewith hereinbefore in order to show that the invention is not limited to the use of certain elements but may be performed in numerous variations.

What I claim as my invention, and desire to secure by Letters Patent, is—

1. In a free-wheel coaster-brake for bicycles, the combination with a wheel hub of an expansible braking element in said hub, expanding members associated with the expansible element, a sprocket mounted to rotate with or ride freely on the hub, screw adjusted means for effecting operation of said expanding members, and a disk on said screw adjusted means actuated by and on the backward rotation of the sprocket to operate the screw adjusted means for effecting the braking action of the braking element, substantially as set forth.

2. In a free-wheel coaster-brake for bicycles, the combination with an axle, a wheel hub and cone bearings on which the hub is journaled, of an expansible braking element in said hub, expanding members associated with the expansible element, a sprocket mounted to rotate with or ride freely on the hub, a member screw adjusted on one of the cone bearings, a slidable device on the axle actuated by said screw adjusted member adapted to effect operation of the expanding elements, and means actuated by and on the backward rotation of the sprocket to operate said screw adjusted member for effecting the braking action on the hub, substantially as set forth.

3. In a free-wheel coaster-brake for bicycles, the combination with a wheel hub and cone bearings on which said hub is journaled, of an expansible braking sleeve in the hub, expanding members associated with the expansible braking sleeve, a sprocket journaled on the hub, means whereby the sprocket may drive the hub forwardly, a device slidable in the hub adapted to actuate one of the expanding members, a screw adjusted member operable to actuate said slidable device, and a disk actuated by and on the backward rotation of the sprocket to operate said screw adjusted member for shifting the slidable device to effect the braking action on the hub, substantially as set forth.

4. In a free-wheel coaster-brake for bicycles, the combination with a wheel hub and cone bearing on which said hub is journaled, of an expansible braking sleeve in the hub, expanding members associated with the expansible braking sleeve, a sprocket journaled on the hub, means whereby the sprocket may drive the hub forwardly, a device slidable on the axle adapted to actuate one of the expanding members, a member screw adjustable on one of the cone bearings operable to actuate said slidable device, and a disk mounted on said screw adjusted member actuated by and on the backward rotation of the sprocket to operate said screw member for shifting the slidable device to effect the braking action on the hub, substantially as set forth.

5. In a free-wheel coaster-brake for bicycles, the combination with a wheel hub, an axle, and cone bearings on which said hub is journaled, of an expansible braking sleeve in the hub, stationary and rotatable cone elements for expanding the braking sleeve, a sprocket journaled on the hub, means whereby the sprocket will drive the hub forwardly, a device slidable on the axle adapted to shift the rotatable cone, a member screw adjustable on one of the cone bearings operable to actuate said slidable device, and a disk splined on said screw adjusted member actuated by and on the backward rotation of the sprocket to operate said member for shifting the slidable device to effect the braking action on the hub, substantially as set forth.

In testimony whereof I have signed my name to this specification in the presence of two subscribing witnesses.

HERMANN SCHMIDT.

Witnesses:
  OSKAR SCHÜLER,
  KARL MUNDT.